United States Patent
Carrier et al.

(10) Patent No.: US 7,357,227 B2
(45) Date of Patent: Apr. 15, 2008

(54) BRAKE CALIPER ASSEMBLY

(75) Inventors: Robert Carrier, Raymond, OH (US);
Hiroki Ishikawa, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 32 days.

(21) Appl. No.: 11/419,637

(22) Filed: May 22, 2006

(65) Prior Publication Data
US 2007/0278056 A1    Dec. 6, 2007

(51) Int. Cl.
*F16D 65/38* (2006.01)

(52) U.S. Cl. .................................. 188/73.39

(58) Field of Classification Search ............... 188/72.4, 188/73.46, 73.47, 73.39
See application file for complete search history.

(56) References Cited

U.S. PATENT DOCUMENTS

2004/0227038 A1* 11/2004 Strasser ..................... 248/74.1
2006/0016646 A1*  1/2006 Banks et al. .......... 188/218 XL

* cited by examiner

*Primary Examiner*—Chris Schwartz
(74) *Attorney, Agent, or Firm*—Rankin, Hill & Clark LLP

(57) ABSTRACT

An abutment block for mounting between ends of a brake pad and a caliper housing is formed as a monolithic structure to prevent relative movement between the block and the caliper housing. The abutment block has a front face directed toward the end of the associated brake pad, and the front face has a recess formed therein. The recess has a mounting hole extending therethough, with the mounting hole being at an acute angle to the front face. The abutment block is received in a recess in the caliper housing, and is securely fastened to the caliper housing by a fastener.

10 Claims, 6 Drawing Sheets

BRAKE CALIPER ASSEMBLY

BACKGROUND OF THE INVENTION

1. Field of the Invention

The present invention is directed toward an improved vehicle brake caliper assembly and, more particularly, toward an improved caliper abutment plate.

2. Description of Related Art

With reference to FIGS. 6-7, a known brake caliper assembly generally includes a caliper housing 20, a pair of brake pads 22, and a mounting assembly for movably mounting the brake pads in the caliper housing 20. In FIGS. 6 and 7, only one half of the caliper housing is illustrated, with it being understood that the other half of the caliper housing is functionally identical. The caliper housing 20 includes one or more pistons (not shown) that receive pressurized brake fluid, typically from the brake master cylinder, and are driven to move toward and away from the backing plate on a rear side of the brake pads 22.

The brake pads 22 are mounted in opposition to one another and on opposite sides of the brake rotor (not shown). The brake pads 22 include a front friction material, and a rear backing plate. Generally, the front friction material is bonded to or otherwise attached to the rear backing plate, and the rear backing plate extends so as to define the peripheral surface of the brake pads. Upon actuation/deactuation of the associated piston(s), the brake pads 22 move relatively toward and away from one another and, in so doing, the friction material on the front of the brake pads 22 is brought into and out of engagement with the brake rotor disposed therebetween.

The brake pad mounting assembly can take many forms. In one form, two or more rods 24 extend between opposite sides of the caliper housing, and the two or more rods 24 extend through associated openings formed in the brake pads 22. The rods 24 also resiliently receive a mounting clip (not shown) that helps to properly position and retain the brake pads 22 in place on the caliper housing 20.

In practice, the inner surface of the caliper housing 20 has a recessed portion 26 in which the brake pads are received. The recessed portion 26 is shaped and sized such that the brake pads 22 (i.e., the front surface of the friction material) are normally generally flush with an interior surface 30 of the caliper housing, and move outwardly so as to project from the interior surface 30 of the caliper housing 20 under the influence of the pistons. Thus, the recessed portion 26 is defined by a rear wall 26a and a pair of end walls 26b, with the pistons extending through the rear wall and toward the backing plate on the rear surface of the associated brake pad 22. The end walls 26b defining the recessed portion 26 of the caliper housing are adjacent to, but spaced slightly from, end surfaces 22a of the brake pad 22. The end surfaces 22a are provided by the backing plate, which extends outwardly from the friction material so as to define the peripheral surface of the brake pad 22, as described hereinbefore. The top and bottom surfaces of the brake pad 22 are generally exposed, although this is not mandatory.

The backing plate at the rear surface of the brake pad 22 is engaged by the caliper pistons, as described hereinbefore. The backing plate end surfaces 22a face toward the associated end walls 26b of the caliper housing recessed portion 26. The caliper housing end walls 26b and brake pad 22 are typically spaced a short distance from one another, the brake pad backing plate and caliper housing are commonly formed from different metals and may tend to corrode over time. For example, the caliper housing is normally formed from a light, relatively soft material, such as aluminum, aluminum alloys, or magnesium alloys, whereas the brake pad backing plate is conventionally formed from a hard, durable material, such as steel.

During braking the backing plate end surfaces 22a engage the end walls 26b of the caliper housing 20. It is believe that torque forces are generated on the brake pad 22 when the brake pad friction material engages the spinning brake rotor, and that these torque forces are transferred to the caliper housing 20 when the backing plate end surfaces 22a contact the caliper housing end walls 26b. Unfortunately, since the caliper housing 20 is conventionally formed from a relatively softer material than the brake pad backing plate, engagement between the backing plate and the caliper housing may wear or deform the relatively softer caliper housing end walls 26b.

In response to these problems, it is known in the art to attach a thin abutment plate 28 to the caliper housing end walls 26b that face toward the brake pad end surfaces 22a so as to receive the backing plate during braking. The known abutment plate 28, which is illustrated best in FIGS. 8 and 9, includes a thin plate-like body 28a and a centrally disposed mounting tab 28b. To accommodate the abutment plate 28, the end walls 26b of the of the caliper housing recessed portion 26 have an angled notch 26c formed therein that is adapted to receive the abutment plate mounting tab 28b. The angled notch 26c defines a planar surface that is at an acute angle to the planar surface of the end wall 26b, preferably at an angle of about 45°.

The abutment plate body 28a is generally planar and u-shaped, and configured to be disposed in a face-to-face manner over the associated surface of the caliper housing end wall 26b. As such, the plate body 28a extends over the caliper housing end wall 26b, and has a length generally equal to a length of the brake pad ends 22a and a width generally equal to a width of the caliper housing end wall 26b and the brake pad thickness. The mounting tab 28b is integrally formed with the plate body 28a, and bent out of the plane of the plate body 28a so as to be secured to the mounting surface that is provided by the notched surface 26c formed in the caliper housing end wall 26b. Preferably, a screw 32 is inserted through a hole 28c formed in the mounting tab 28b and threaded into a tapped hole extending through the angled notch 26c of the end wall 26b so as to secure the abutment plate 28 to the caliper housing 20.

This arrangement works well in preventing contact between the brake pad end surfaces 22a and the caliper housing 20. However, it has been found to be rather noisy. In this regard it is important to note that the abutment plate 28 is thin, lacks substantial mass, and is only positively secured to the caliper housing end wall 26b at the mounting tab 28b, which itself is only connected to the abutment plate body 28a at the upper end of the tab.

It is believed that, in use, ends 28d of the abutment plate body 28a may become warped or otherwise displaced from firm engagement with the caliper housing end walls 26 and, upon application of the brakes, may chatter or repeatedly engage and disengage with the caliper housing 20, creating a disturbing noise that is objectionable to the operator. It is believed that one reason for this possible distortion of the abutment plate 28 is that the abutment plate is relatively thin, has low stiffness, and is not robust enough to provide a stable engagement surface to receive the brake pad backing plate end surfaces 22a. It is also believed that the abutment plate may distort since the plate is only secured to the caliper housing 20 via the screw connection of the mounting tab 28b at the mid-portion of the abutment plate body 28a, while the ends 28*d* of the abutment plate body 28*a* are not positively secured to the caliper housing 20. In this regard it is thought that having the mounting tab 28*b* separated from the abutment plate body 28*a* and bent out of the plane of the abutment plate body 28*a* weakens the support or attachment that the mounting tab 28*b* provides to the abutment plate 28, especially the ends 28*d* of the abutment plate 28, and allows the abutment plate body 28*a* to warp or bend over time.

Accordingly, there exists a need in the art for an improved structure that avoids or minimizes the problems found in the prior art.

SUMMARY OF THE INVENTION

The present invention is directed toward an improved abutment block for use in a disc brake caliper assembly, and toward an improved caliper assembly incorporating an improved abutment block.

In accordance with the present invention, a brake pad abutment block includes a monolithic body that is adapted to be rigidly and securely affixed to a caliper housing. The abutment block is formed from a generally rectangular unitary piece of metal, and has an attachment recess and hole formed therein. The attachment recess defines a plane that is at an angle to the outer surfaces of the abutment block, and the attachment hole is generally perpendicular to the plane defined by the attachment recess.

BRIEF DESCRIPTION OF THE DRAWINGS

These and further features of the invention will be apparent with reference to the following description and drawings, wherein.

DETAILED DESCRIPTION OF THE PREFERRED EMBODIMENTS

Figure 1:
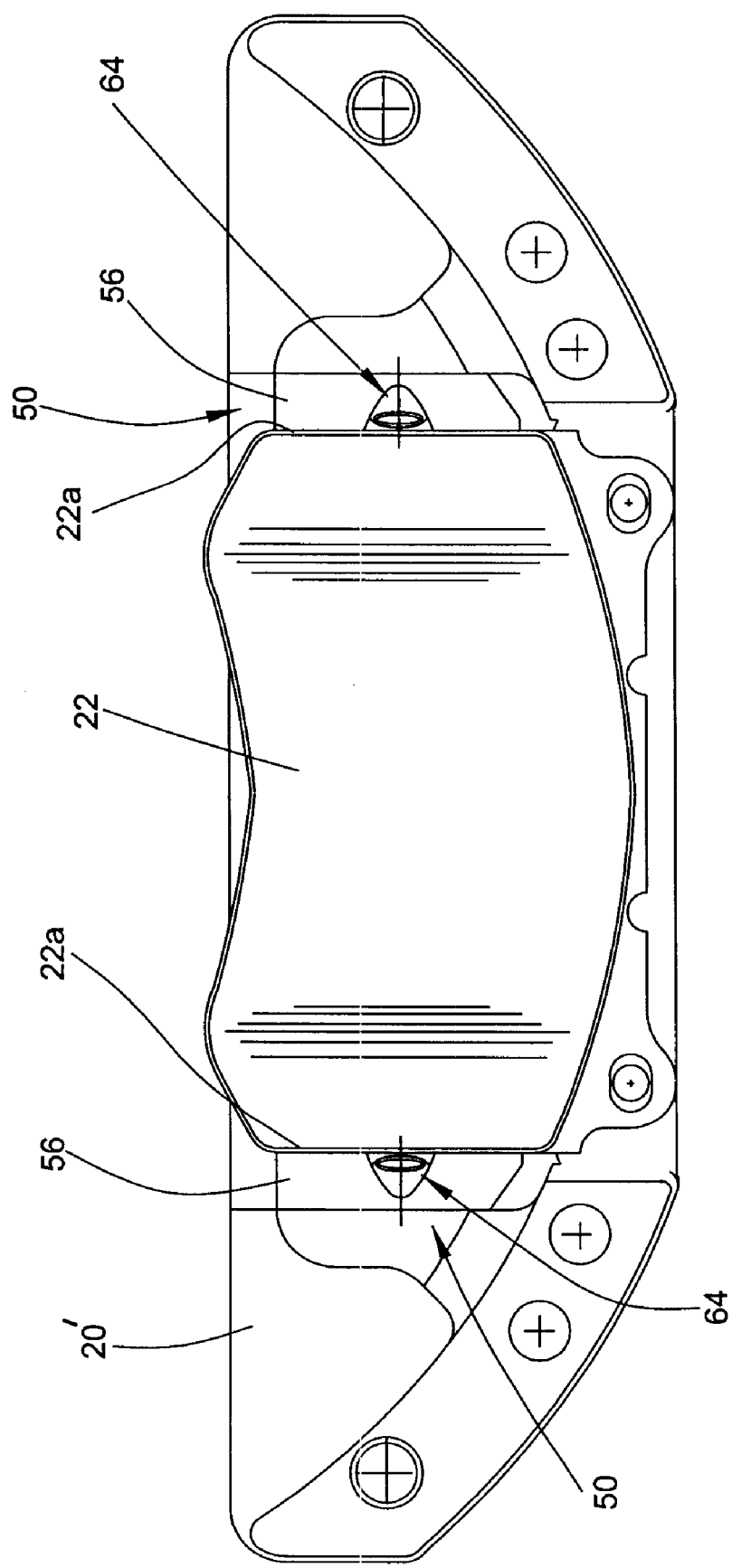
FIG. 1 is an elevational view of a portion of a brake caliper housing incorporating the abutment block of the present invention.
Figure 2:
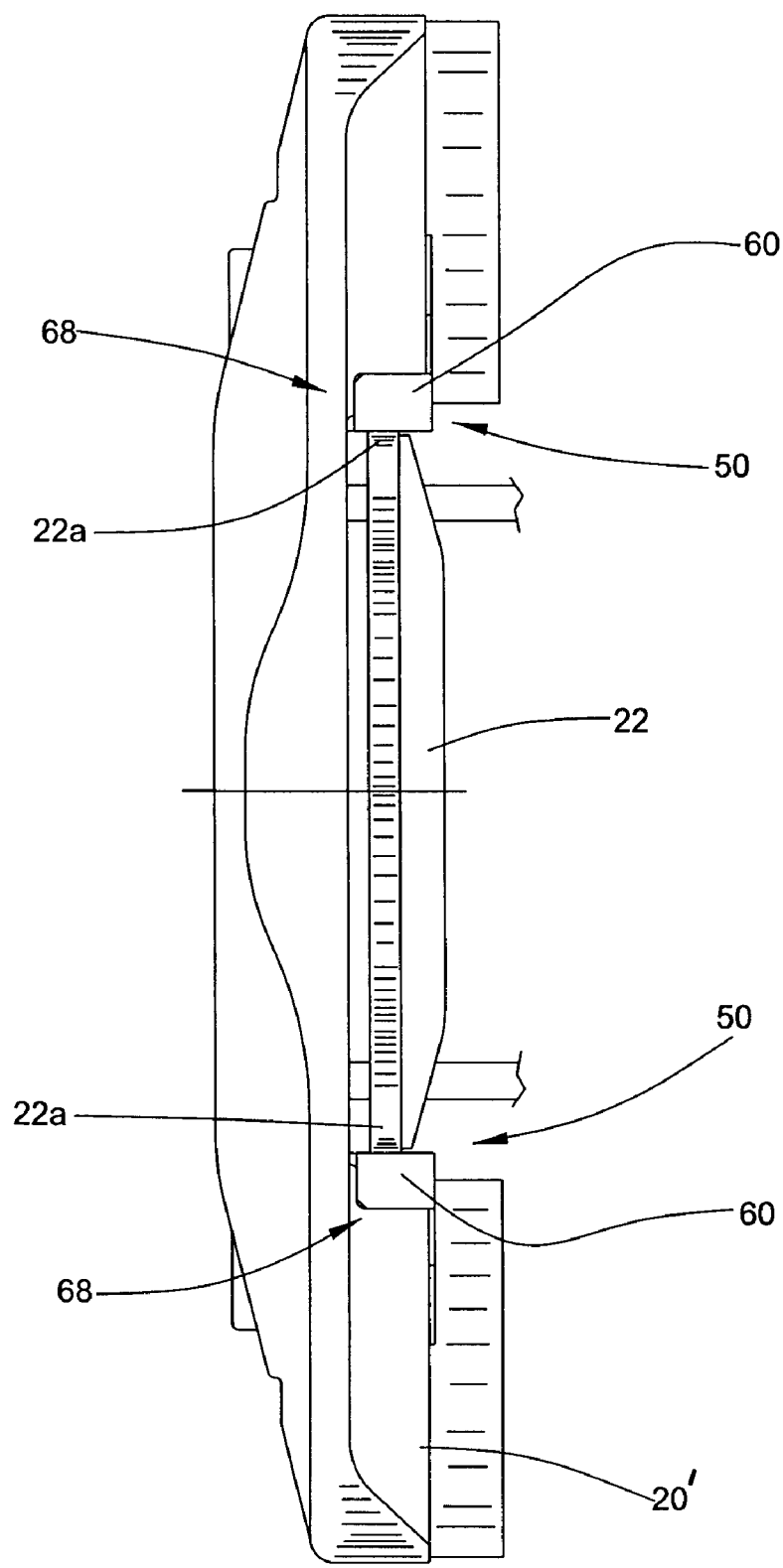
FIG. 2 is a top plan view of the brake caliper housing portion shown in FIG. 1.
Figure 8:
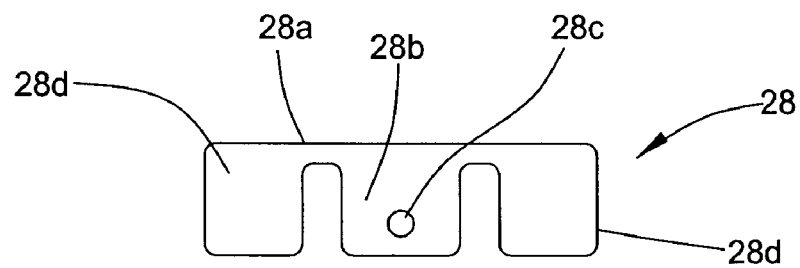
FIG. 8 is a top plan view of the known abutment plate.
Figure 9:
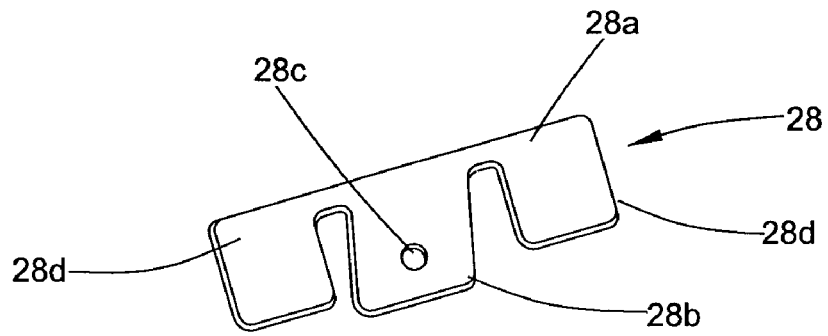
FIG. 9 is a perspective view of the known abutment plate.
Figure 3:
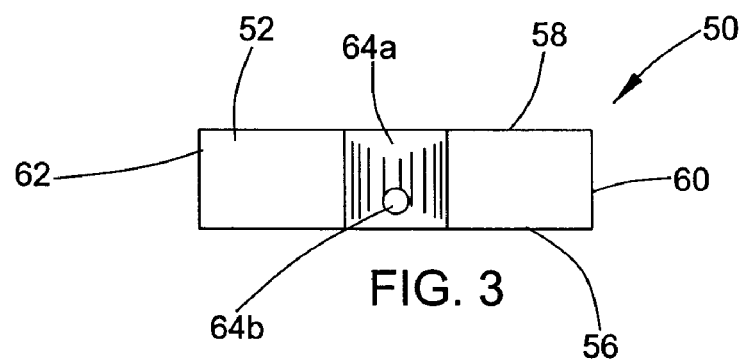
FIG. 3 is a top plan view of the abutment block of the present invention.
Figure 4:
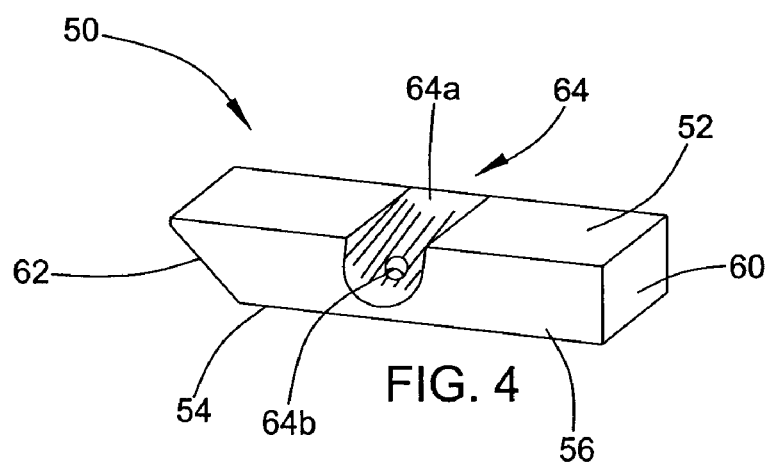
FIG. 4 is a perspective view of the abutment block.
Figure 10:
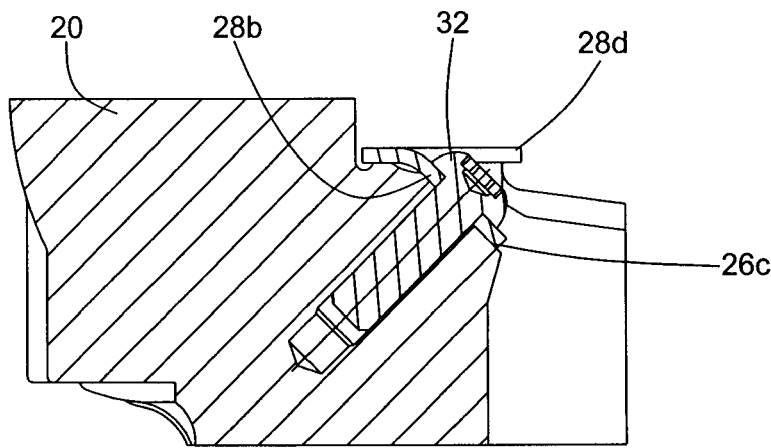
FIG. 10 is a cross-sectional view of the known abutment plate and brake caliper housing

With reference to the FIGS. 3-5A, the improved caliper abutment block 50 of the present invention is illustrated. The caliper abutment block 50 is a monolithic or unitary structure that is generally shaped as a rectangular cube. More specifically, the abutment block 50 has a rectangular torque-receiving front face 52, a rectangular rear face 54, upper and lower ends 60, 62, and first and second lateral sides 56, 58. The first lateral side 56 of the abutment block 50 faces toward the brake rotor (not shown); whereas the second lateral side 58 of the abutment block 50 faces toward the caliper housing 20'. As will be appreciated from the illustrations, the front and rear faces 52, 54 are generally larger than the first and second lateral sides 56, 58 which are, in turn, generally larger than the upper and lower ends 60, 62.

The peripheral dimensions of the front face 52 and the rear face 54 of the abutment block 50 are generally adapted to the dimensions of the associated brake pad 22 and the configuration of the caliper housing 20'. More specifically, the front face 52 has a length that is generally equal to the length of the brake pad backing plate end 22*a*, and a width that is generally equal to the width (depth) of the brake pad 22. The rear face 54 has peripheral dimensions similar to that of the front face 52, as illustrated, but is adapted for mounting or attachment to the caliper housing 20'.

A mounting recess or notch 64 is formed in the front face 52 and the first lateral side 56 of the abutment block 50. The mounting recess or notch 64 has a generally planar bottom 64*a* that is sufficient to receive a fastener 66 that extends through a mounting hole 64*b* formed in the abutment block 50. More specifically, and as illustrated in FIGS. 3-5A, the mounting hole 64*b* extends generally perpendicular to the planar bottom 64*a* of the mounting recess 64, and at an angle of about 60° to the front face 52 of the abutment block 50 and through the rear face 54 of the abutment block 50.

Preferably, the mounting hole 64*b* in the abutment block is slightly larger in diameter than the fastener 66, such that the fastener 66 is not threaded into the abutment block 50. Similarly, an upper portion of the hole in the caliper housing that receives the fastener 66 is relatively enlarged so as to loosely receive the fastener 66, with only a lower portion of the caliper housing hole being tapped to threadably receive the fastener. Rather loosely (i.e., not positively) receiving the fastener 66 in the abutment block 50 prevents or minimizes the transfer of torque forces from the brake rotor to the fastener, and instead allows such forces to be transferred to the caliper housing 20' via the abutment block 50. Also, having a relatively enlarged abutment block mounting hole 64*b* and a relatively enlarged upper portion of the caliper housing hole eases insertion of the fastener therein while positioning and aligning the abutment block 50 on the caliper housing 20', and thereby greatly facilitates assembly of the abutment block 50 on the caliper housing 20'.

The prior art caliper housing 20 described hereinbefore is modified or adapted to receive the improved abutment block, and is referred to hereinafter as caliper housing 20'. More specifically, the caliper housing 20' includes a recess 68 in which the abutment block 50 is received. The recess 68, which is L-shaped in cross section, is defined by a first wall 70 and an end wall 72. The end wall 72 receives the rear face 54 of the abutment block 50 in a face-to-face manner, and is dimensioned to match the dimensions of the abutment block rear face 54. The end wall 72 includes a tapped opening that receives the mounting screw 66 extending through the mounting hole 64*b* formed through the abutment block 50. The first wall 70 receives the second lateral side 58 of the abutment block 50 in a face-to-face manner, and generally matches the dimensions of the abutment block second lateral side 58.

It will be appreciated that the tapped mounting hole formed in the end wall 72 of the caliper housing 20' is at an angle (i.e., 60°) to the surface of the end wall 72. It is believed that forming the mounting hole in this direction or orientation helps to push the abutment block 50 back into the corner formed between the end wall 72 and first wall 70 of the caliper housing 20', and generally provides a more stable and secure attachment of the abutment block 50 to the caliper housing 20'.

The abutment block 50 of the present invention has a sufficient mass to prevent distortion due to heat, and sufficient thickness to prevent warping or bending under the influence of the associated brake pad 22. Due at least in part to the monolithic, unsegmented design of the abutment block 50, the rear face 54 and second lateral face 58 of the abutment block 50 remain in complete face-to-face contact with the caliper housing 20', providing a stable abutment surface (front face 52) to receive the ends 22a of the brake pads 22. Upper and lower ends of the abutment block remain in position and in engagement with the caliper housing 20'. Thus, the abutment block 50 does not move relative to the caliper housing 20', so noise is minimized during operation of the brake assembly.

Figure 5A:
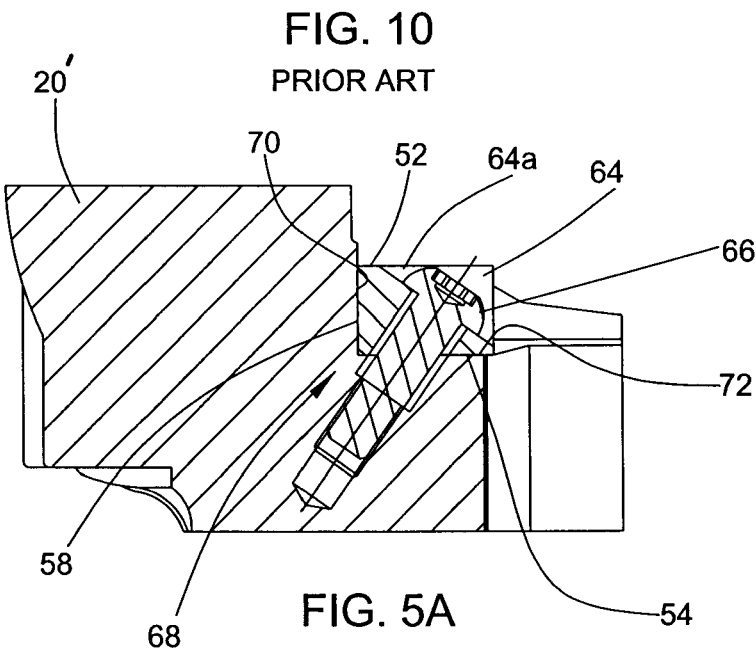
FIG. 5A is a cross-sectional view of the abutment block and brake caliper housing.
Figure 5B:
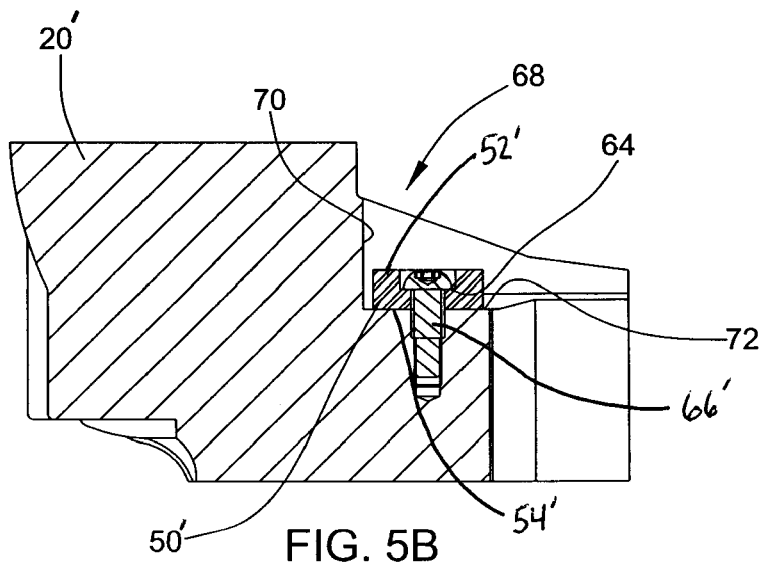
FIG. 5B is a cross-sectional view similar to FIG. 5A, but showing an alternative abutment block according to the present invention.
Figure 6:
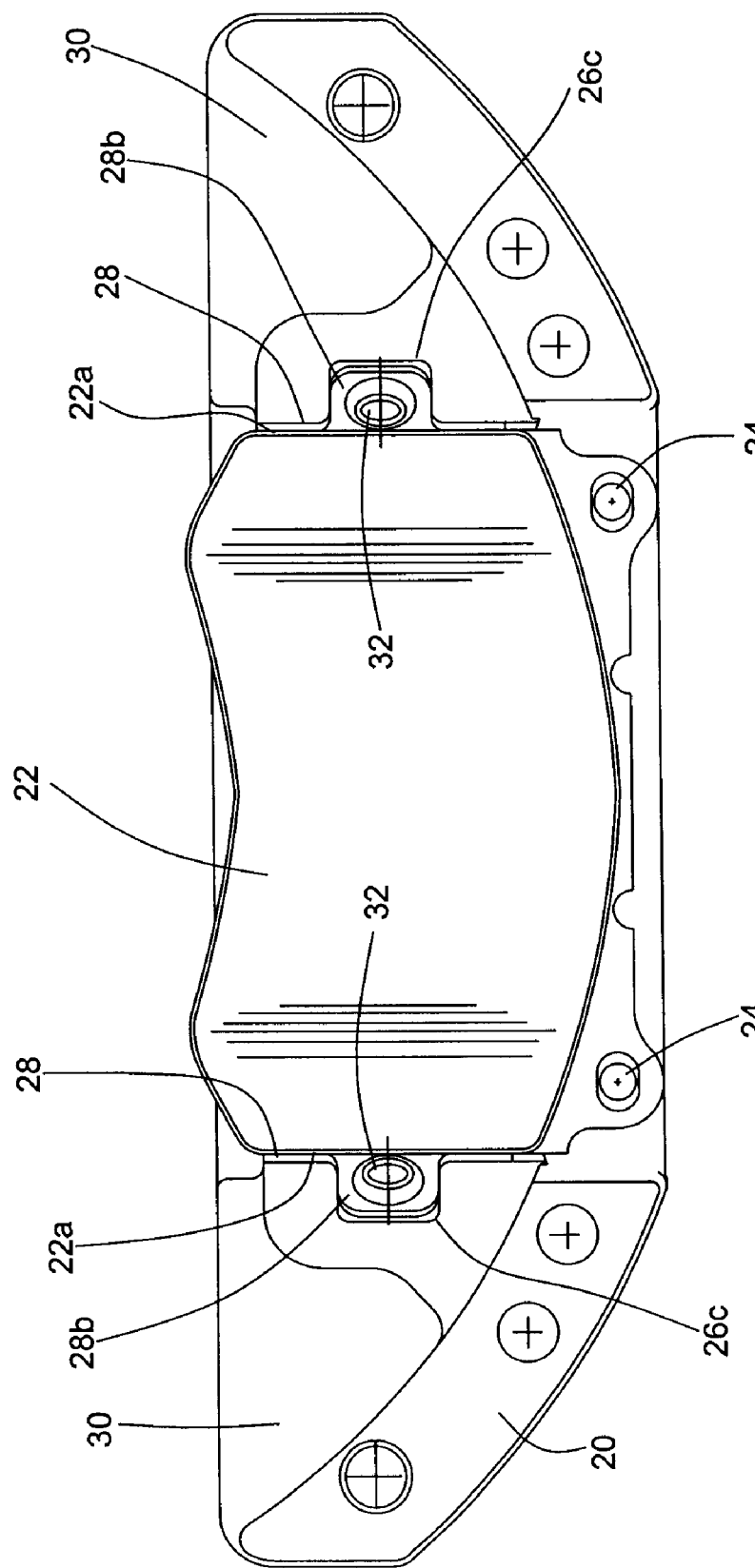
FIG. 6 is an elevational view of a portion of a brake caliper housing incorporating a known abutment plate.
Figure 7:
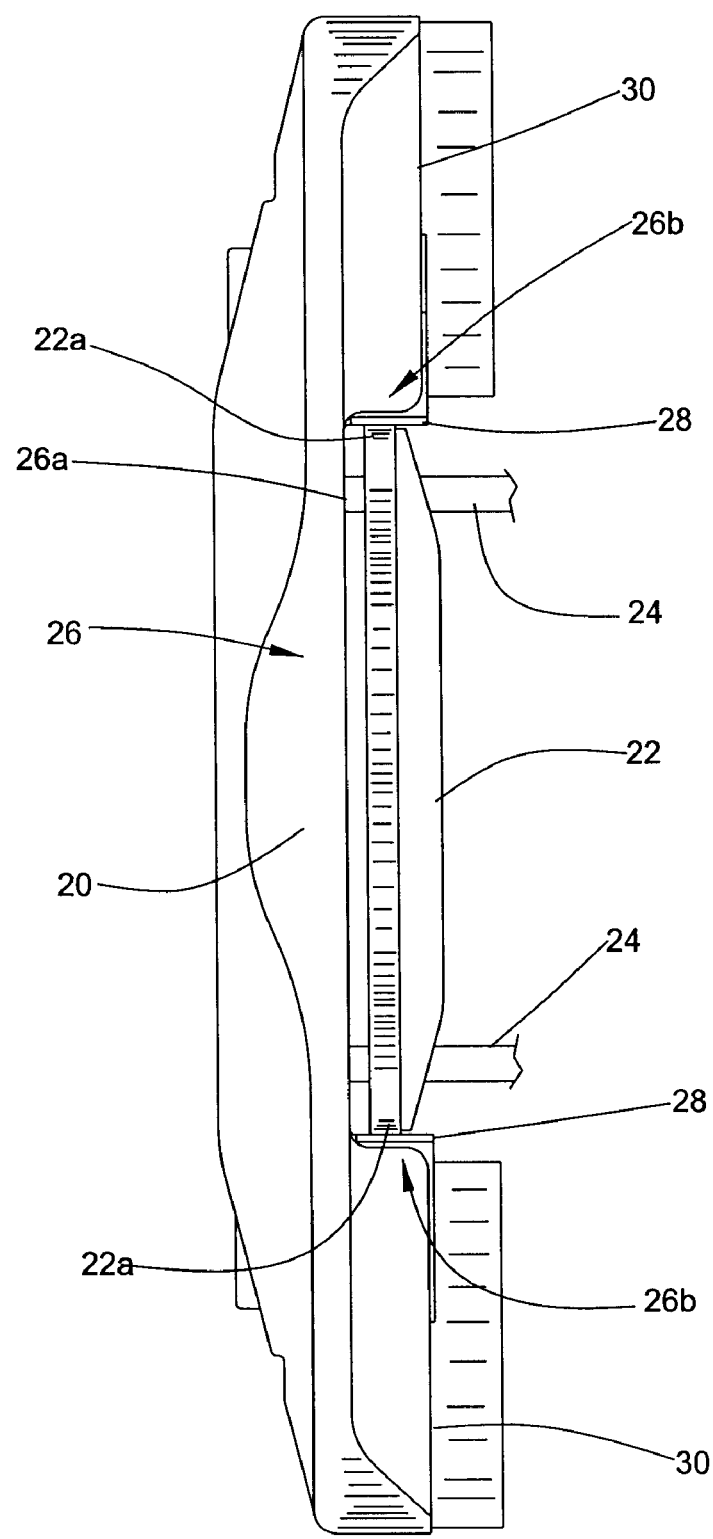
FIG. 7 is a top plan view of the brake caliper housing portion shown in FIG. 6.

Although the abutment block 50 illustrated and described hereinbefore is preferred, it is contemplated that different abutment block designs and mounting arrangements may also be used without departing from the scope and spirit of the present invention. For example, an alternative abutment block 50' is illustrated in FIG. 5B. In the alternative abutment block 50', the mounting hole 64 is formed through the block front face 52' and rear face 54' and therefore extends orthogonally into the end wall 72 of the caliper housing 20'. The mounting hole 64 is generally normal to the front and rear faces of the abutment block 50'. The mounting hole is countersunk, as illustrated, and slightly larger than the fastener 66' so as to not be positively directly threaded to the fastener. Preferably, as in the first described embodiment, only the lower portion of the hole in the caliper housing 20' is tapped, with the upper portion being slightly larger than the fastener 66'. Thus, the only direct connection between the fastener 66' and the caliper housing 20' is the threaded connection at the lower end of the fastener 66'. Although this alternative abutment block 50' is shown spaced from the corner between the first wall 70 and end wall 72, it is naturally contemplated that the alternative abutment block 50' could be tightly received in the corner.

Although not illustrated, it is also contemplated that the fastener 66, 66' could instead be made to extend through a mounting hole in the first and second lateral sides 56, 58 of the adjustment block so as to project into the first wall 70 of the caliper housing 20'. In this further alternative, the mounting hole through the abutment block would be slightly larger than the fastener, so as to slidably receive the fastener, and an end of the fastener 66, 66' would be threaded into a tapped hole in the first wall 70 of the caliper housing 20'.

While the present invention has been described herein with particularity, the scope of the invention is not limited thereto. Rather, the present invention is only defined by the claims appended hereto.

What is claimed is:

1. An abutment block for use in a brake caliper assembly, said abutment block being a monolithic structure including a front face, a rear face, and first and second lateral faces, said rear face being adapted for engagement with a caliper housing, said front face being directed toward an end of a brake pad and being adapted to receive the brake pad end surface, said front face having a recess formed therein, a bottom surface of said recess being disposed at an angle to said front face, and wherein a mounting hole extends through the recess bottom surface and the abutment block rear face and generally perpendicular to said recess bottom surface, said mounting hole being adapted to receive a fastener to permit securement of said abutment block to the caliper housing.

2. The abutment block according to claim 1, wherein said mounting hole is slightly larger than said fastener such that said fastener loosely engages said abutment block at the mounting hole.

3. A brake caliper assembly, comprising:
   a caliper housing, said caliper housing including a pair of recesses that are L-shaped in cross-section;
   a brake pad secured to said caliper housing, said brake pad including a front face, a rear face, and a pair of end faces, said rear face being disposed adjacent the caliper housing;
   a pair of abutment blocks, each of said abutment blocks being mounted within one of said caliper housing L-shaped recesses so as to be disposed between one of said brake pad end faces and said caliper housing, each said abutment block being a monolithic structure comprising:
   a front face, a rear face, and first and second lateral faces, said rear face and said second lateral face being adapted for engagement with a caliper housing, said front face being directed toward and being adapted to receive the brake pad end surface, said front face having a recess formed therein, a bottom surface of said recess being disposed at an angle to said front face, and wherein a mounting hole extends through the recess bottom surface and the abutment block rear face and generally perpendicular to said recess bottom surface, and wherein a fastener extends through said mounting hole and into said caliper housing.

4. The brake caliper assembly according to claim 3, wherein said mounting hole is formed at an angle of about 60° to the front face.

5. The brake caliper assembly according to claim 4, wherein said mounting hole is slightly larger than said fastener such that said fastener loosely engages said abutment block at the mounting hole.

6. The brake caliper assembly according to claim 5, wherein said fastener extends into a mounting hole in said caliper housing, and wherein a top portion of said caliper housing mounting hole is slightly larger than said fastener, and wherein a bottom portion of said caliper housing mounting hole is tapped such that said fastener is threadably received in said caliper housing mounting hole.

7. The brake caliper assembly according to claim 4, wherein said fastener extends into a mounting hole in said caliper housing, and wherein a top portion of said caliper housing mounting hole is slightly larger than said fastener, and wherein a bottom portion of said caliper housing mounting hole is tapped such that said fastener is threadably received in said caliper housing mounting hole.

8. The brake caliper assembly according to claim 3, wherein the abutment block recess is also formed in said first lateral surface.

9. The brake caliper assembly according to claim 3, wherein said mounting hole is slightly larger than said fastener such that said fastener loosely engages said abutment block at the mounting hole.

10. A brake caliper assembly, comprising:
    a caliper housing, said caliper housing including a pair of recesses that are L-shaped in cross-section;
    a brake pad secured to said caliper housing, said brake pad including a front face, a rear face, and a pair of end faces, said rear face being disposed adjacent the caliper housing;

a pair of abutment blocks, each of said abutment blocks being mounted within one of said caliper housing L-shaped recesses so as to be disposed between one of said brake pad end faces and said caliper housing, each said abutment block being a monolithic structure comprising:

a front face, a rear face, and first and second lateral faces, at least one of said rear face and said second lateral face being disposed in face to face engagement with the caliper housing, said front face being directed toward and being adapted to receive the brake pad end surface, and wherein a mounting hole extends one of said front face and said first lateral face of said abutment and generally perpendicular to said one of said front and first lateral face, and wherein a fastener extends through said mounting hole and into said caliper housing, said mounting hole being slightly larger than said fastener such that said fastener is loosely received in said mounting hole, and wherein said fastener is threadably received in said caliper housing.

* * * * *